US010872514B1

(12) United States Patent
Glatfelter et al.

(10) Patent No.: US 10,872,514 B1
(45) Date of Patent: Dec. 22, 2020

(54) SAFETY SYSTEM FOR TRACKING MOVABLE OBJECTS DURING VEHICLE PRODUCTION

(71) Applicant: The Boeing Company, Chicago, IL (US)

(72) Inventors: John William Glatfelter, Kennett Square, PA (US); Richard Patrick Meagher, Upper Chichester, PA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/540,554

(22) Filed: Aug. 14, 2019

(51) Int. Cl.
| | |
|---|---|
| *F16P 3/00* | (2006.01) |
| *G08B 21/18* | (2006.01) |
| *G08B 21/02* | (2006.01) |
| *G01S 17/50* | (2006.01) |
| *H04L 29/08* | (2006.01) |
| *B25J 9/16* | (2006.01) |
| *G01S 17/58* | (2006.01) |
| *G05B 9/02* | (2006.01) |
| *G01S 17/89* | (2020.01) |

(52) U.S. Cl.
CPC ............... *G08B 21/18* (2013.01); *F16P 3/00* (2013.01); *G01S 17/50* (2013.01); *G08B 21/02* (2013.01); *B25J 9/1676* (2013.01); *G01S 17/58* (2013.01); *G01S 17/89* (2013.01); *G05B 9/02* (2013.01); *H04L 67/12* (2013.01)

(58) Field of Classification Search
CPC ....... G08B 21/02; B25J 9/1676; B25J 9/1674; G01S 17/50; G01S 17/58; G01S 17/88; G01S 17/89; G05B 9/02; F16P 3/00
See application file for complete search history.

(56) References Cited

U.S. PATENT DOCUMENTS

| | | | |
|---|---|---|---|
| 6,915,952 B1 | 7/2005 | Allen | |
| 6,989,749 B2 | 1/2006 | Mohr | |
| 7,541,927 B2 | 6/2009 | Dupler et al. | |
| 7,755,482 B2 | 7/2010 | Hubbard | |
| 8,159,345 B2 | 4/2012 | Stevens | |
| 9,513,606 B1 | 12/2016 | Larsen et al. | |
| 9,533,773 B1 | 1/2017 | Jang et al. | |
| 9,949,075 B2 | 4/2018 | Burch et al. | |
| 10,022,853 B1 | 7/2018 | Mollica | |
| 10,181,060 B2 | 1/2019 | Krug et al. | |
| 2003/0102970 A1 | 6/2003 | Creel et al. | |
| 2006/0049939 A1 | 3/2006 | Haberer et al. | |

(Continued)

*Primary Examiner* — Benyam Haile
(74) *Attorney, Agent, or Firm* — Ostrager Chong Flaherty & Broitman P.C.

(57) ABSTRACT

Safety systems and methods for tracking objects such as personnel and tools during a vehicle build process and activating an alarm when the tracked object is within a safety zone where such presence is not permitted under the current circumstances. The safety system includes a multiplicity of active positioning sensors configured to detect the presence of an object at a particular distance from or within a particular area or volume of space and a controller configured to use sensor data to calculate the virtual location of each sensed object relative to a virtual computer-aided design map of the as-built aircraft design. In response to detection of the presence of an object in unacceptable proximity to or within a particular safety zone of the vehicle, an alarm is activated and the planned build process is altered.

20 Claims, 12 Drawing Sheets

(56) References Cited

U.S. PATENT DOCUMENTS

| | | |
|---|---|---|
| 2007/0194944 A1 | 8/2007 | Galera et al. |
| 2009/0072029 A1 | 3/2009 | Martin |
| 2011/0298579 A1* | 12/2011 | Hardegger .............. G01S 17/10 340/3.1 |
| 2015/0253766 A1* | 9/2015 | Pettersson ........ G05B 19/41805 700/168 |
| 2016/0179909 A1 | 6/2016 | Wells et al. |

* cited by examiner

SAFETY SYSTEM FOR TRACKING MOVABLE OBJECTS DURING VEHICLE PRODUCTION

BACKGROUND

The present disclosure relates generally to systems and methods for ensuring the safety of personnel during the production of a vehicle or other machine comprising electrical equipment. In particular, this disclosure relates to systems and methods for ensuring the safety of personnel during a "power-on" stage of a vehicle (e.g., aircraft) build process.

There are three major stages in a typical aircraft build process. The first stage is structural assembly. This step is constrained by the fact that most critical tasks need to be performed with the aircraft in a stress-free condition. Therefore, no aircraft movements are possible during execution of the structural assembly step. The second stage is equipment installations. Equipment installation includes electrical installations and hydraulic and fuel pipeline modifications. Tests that do not require aircraft power on are also included in this stage. The third stage is indoor power-on tests and first refurbishing. The tests are performed indoor with aircraft power on. The third stage also includes the refurbishing of those parts that will not be either disassembled or damaged during outdoor tests.

Tracking people and tools located in proximity to areas of an aircraft (or other vehicle) that will be electrified during a "power-on" stage of production is challenging. When electric power is turned on, safety is paramount.

SUMMARY

The subject matter disclosed in detail below is directed to safety systems and methods for tracking objects such as personnel and tools (e.g. wrenches, wire strippers, soldering guns, etc.) during a vehicle build process and activating an alarm when the tracked object is within a defined safety zone. For example, a tool or piece of equipment may be in proximity to electrical equipment of a vehicle prior to a scheduled electrification. In particular, the safety systems and methods proposed herein ameliorate or mitigate the dangers which may arise during a "power-on" stage of an aircraft build process or during operation of machinery or robots capable of causing harm to a human. The safety systems and methods disclosed herein are useful in production environments such as aircraft production facilities. The safety system includes at least one sensing device configured to detect the presence of a person or tool within a safety zone, and a controller configured to automatically alter at least one aspect of the production environment responsive to the detection of the human and/or tool presence in the safety zone.

In accordance with some embodiments, the safety system includes a multiplicity of active positioning sensors (e.g., active or passive RFID devices, smartphones or watches, blue-tooth device, etc.). The sensors are configured to detect the location an object relative to a particular area or volume of space. As used herein, the term "sensor" means a device that responds to a physical stimulus (such as heat, light, sound, pressure, magnetism or a particular motion) and transmits a resulting impulse (as for measurement or operating a control). The safety system further includes a controller that is configured to receive sensor data from sensors of a sensor network and use that sensor data to calculate the virtual location of each sensed object relative to a digital map having virtual prioritized safety zones defined in the coordinate system of the sensor network. More specifically, the controller calculates the virtual location of a sensed object in the frame of reference of a sensor network and then determines whether that virtual location is within a virtual safety zone having a known location and extent in the frame of reference of the sensor network. In response to detection of the presence of an object in unacceptable proximity to or within a particular safety zone of the vehicle in production, an alarm is activated and the planned build process is altered, e.g., by blocking electrification of electrical equipment onboard the vehicle. More specifically, the controller measures the distance separating the object from electrified areas of the vehicle and then issues a control signal that engages a lock-out of the next scheduled "power-on" phase of the vehicle build process. In addition, safety personnel may be dispatched to the vehicle to recover tools that are out of place.

One proposed implementation of the safety system has the capabilities to: (1) calculate the virtual location of the tool or personnel relative to a virtual map derived from a computer-aided design (CAD) model of the as-built vehicle as opposed to sensing the physical presence of the tool within a physical area/volume; (2) derive safety zones mathematically by offsetting three-dimensional (3-D) nested shapes (two or more) based on a 3-D CAD model of the aircraft; (3) derive plural safety zones that are not contiguous (e.g., the avionics bay and the aft landing gear), but are defined to have the same urgency and priority (thus treating the plural safety zones as a single safety zone); (4) create 3-D nested zones which are governed by programmable rules that act in safety response modes of increasing priority (e.g., warning→warning tone/noise→stop production line); (5) customize and change the rules to meet one or more of changing needs, changing safety procedures, and changing 3-D aircraft shapes (e.g., engineering changes); (6) compute whether a tag (e.g., worn on a person or attached to or incorporated in a tool) is located within a volume of space; (7) track, monitor and account for any equipment or tool in use by humans—powered or not—and ensure that the equipment or tool is returned to its proper storage location before aircraft power-up (or before any production process involving complex heavy machinery or robots may resume); and (8) use smartphones or tablets to log, detect, track, sense and alert humans while providing access to applications needed to compute the location of lost objects in 3-D space and look up part or tool information.

Although various embodiments of systems and methods for tracking personnel and tools in a vehicle production environment are described in some detail later herein, one or more of those embodiments may be characterized by one or more of the following aspects.

One aspect of the subject matter disclosed in detail below is a method for tracking objects in a vehicle production environment, the method comprising: (a) constructing a digital map including virtual boundaries of a vehicle and a virtual safety zone positioned in accordance with a coordinate system of a sensor network using vehicle model data and safety specifications; (b) receiving sensor inputs from the sensor network; (c) determining a virtual location of an object on the digital map based on sensor inputs which locate the object in the coordinate system of the sensor network; and (d) issuing an alert in response to a determination in step (c) that the virtual location of the object is within the virtual safety zone. In cases wherein the vehicle includes electrical equipment in a zone corresponding to the virtual safety zone, the method further comprises blocking electrification of the electrical equipment in response to issuing the alert. In accordance with one embodiment, step (c) further comprises estimating an actual (physical) distance separating the object from a hypothetical geometric boundary in physical space corresponding to the virtual safety zone by calculating a virtual distance separating the virtual location of the object from the virtual safety zone in the digital map.

Another aspect of the subject matter disclosed in detail below is a system for tracking objects in a vehicle production environment, the system comprising a non-transitory tangible computer-readable storage medium storing a vehicle model database, a sensor network having a coordinate system, an alarm system and a proximity tracking computer system communicatively coupled to receive sensor inputs from the sensor network and send alert signals to the alarm system, wherein the proximity tracking computer system is configured to perform operations comprising: (a) constructing a digital map including virtual boundaries of a vehicle and a virtual safety zone positioned in accordance with the coordinate system of the sensor network using vehicle model data and safety specifications; (b) receiving sensor inputs from the sensor network; (c) determining a virtual location of an object on the digital map based on sensor inputs which locate the object in the coordinate system of the sensor network; and (d) activating the alarm system to issue an alert in response to a determination in operation (c) that the virtual location of the object is within the virtual safety zone. In accordance with one embodiment, the proximity tracking computer system comprises a proximity calculations module which is configured to calculate the virtual location of the object in the coordinate system of the sensor network based on sensor inputs received from the sensor network and then calculate a proximity value equal to a distance separating the object from the virtual safety zone.

A further aspect of the subject matter disclosed in detail below is a method for tracking objects in a vehicle production environment, the method comprising: (a) registering a tool in a non-transitory tangible computer-readable storage medium of a mobile electronic device that is configured to measure a distance separating the tool from the mobile electronic device; (b) carrying the tool and the mobile electronic device in the vehicle production environment; (c) placing the tool at a location in the vehicle production environment; (d) carrying the mobile electronic device away from the location where the tool was placed; (e) measuring the distance separating the tool from the mobile electronic device as the mobile electronic device is carried away from the location where the tool was placed; (f) activating an alert device of the mobile electronic device when the measured distance equals a first specified threshold; (g) sending a wireless communication to a proximity tracking computer system when the measured distance equals a second specified threshold greater than the first specified threshold; and (h) altering an aspect of the vehicle production environment responsive to the sending of the wireless communication. In accordance with some embodiments, the mobile electronic device is an RFID-enabled smartphone, smart watch or tablet, and step (h) comprises blocking electrification of electrical equipment onboard a vehicle being produced in the vehicle production environment.

Other aspects of systems and methods for tracking personnel and tools in a vehicle production environment are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

Figure 1:
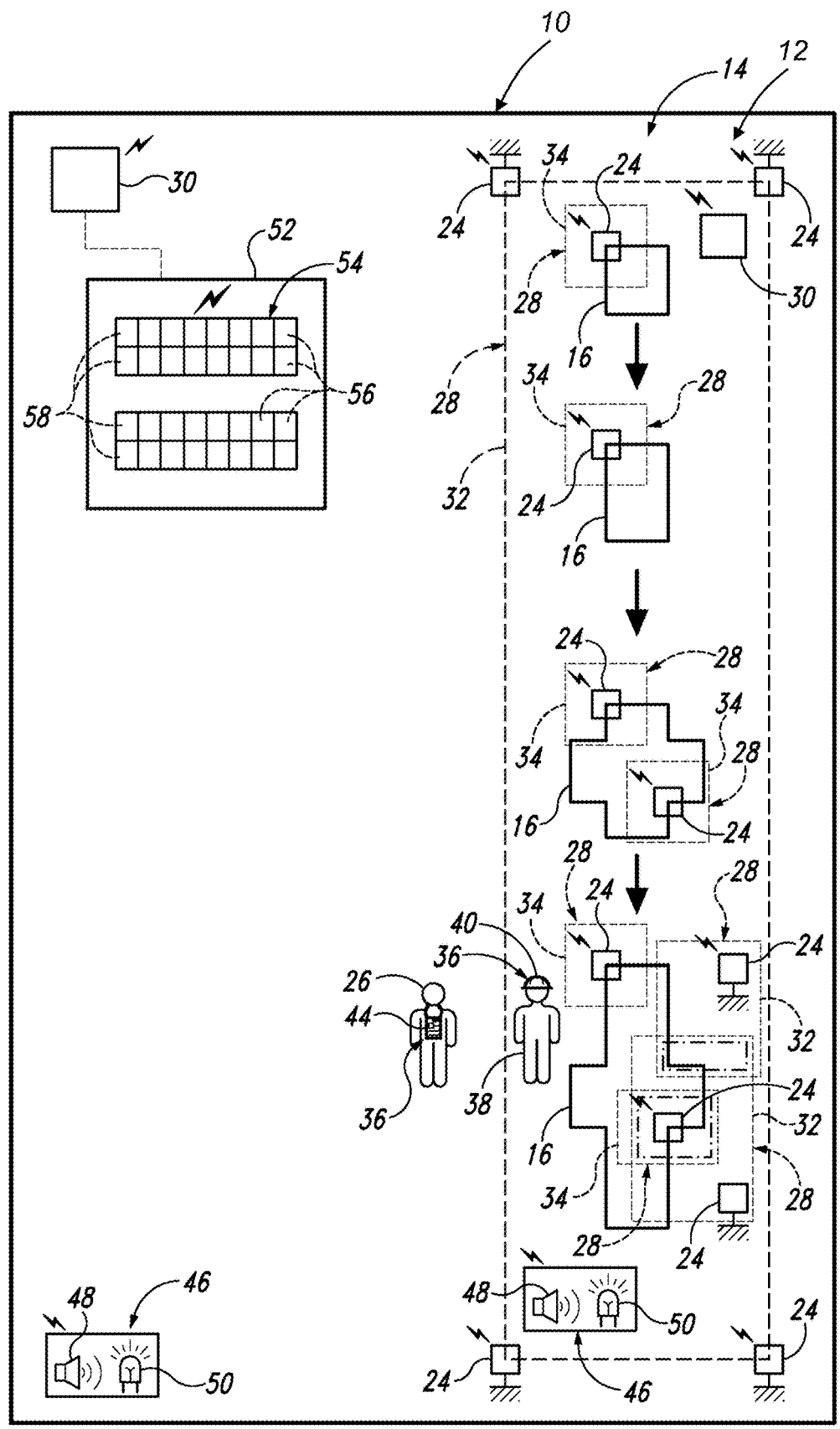
FIG. 1 is a block diagram identifying some components of a safety system designed for use in a vehicle production environment.

Reference will hereinafter be made to the drawings in which similar elements in different drawings bear the same reference numerals. Where reference is made in any one or more of the accompanying drawings to steps and/or features, which have the same reference numerals, those steps and/or features have, for the purposes of this description, the same function(s) or operation(s), unless the contrary intention is apparent.

DETAILED DESCRIPTION

Illustrative embodiments of systems and methods for tracking personnel and tools in a vehicle production environment are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Safety systems and methods for production environments are disclosed herein. As used herein, a production environment corresponds to any suitable facility, location, structure, or other environment where manufacturing, testing, assembling, and/or other industrial process are performed and in which one or more potential hazards for humans operating within or near the production environment are present. As illustrative, non-exclusive examples, facilities associated with the manufacture and assembly of aircraft, spacecraft, watercraft, land vehicles, and/or heavy machinery and facilities that include one or more assembly lines, machine tools, and/or robots are within the scope of production environments, as used herein.

FIG. 1 schematically represents an illustrative, non-exclusive example of a production environment 10 associated with a safety system 12. The production environment 10 includes an assembly line 14 associated with the cumulative assembly of a vehicle 16 as it moves along the assembly line 14, with this motion represented by the arrows and with the cumulative assembly represented by the increase in size and change in shape of the schematic representation of the vehicle 16. Vehicle 16 may correspond to an aircraft, a spacecraft, a watercraft, a land vehicle, etc.

The safety system 12 partly depicted in FIG. 1 includes at least one sensing device 24 that is configured to detect the presence of an unauthorized person 26 (hereinafter "person 26") and/or an authorized person 38 (hereinafter "user 38") at least partially within a defined safety zone 28. Sensing devices 24 may take any suitable form, such as cameras, multispectral cameras, multispectral sensors, infrared cameras, infrared sensors, optical cameras, optical sensors, ultraviolet cameras, ultraviolet sensors, combined visible and infrared cameras, and wide-dynamic-range cameras.

The safety system 12 further includes at least one controller 30 that is configured to automatically alter at least one aspect of the production environment 10 responsive to a sensing device 24 detecting the presence or imminent entry of a person within the defined safety zone 28 or a sub-zone thereof. Each controller may be a respective computer system. As used herein, the term "computer system" should be construed broadly to encompass a system having at least one computer or processor, and which may have multiple computers or processors that are communicatively coupled via a network (wired or wireless) or bus. As used in the preceding sentence, the terms "computer" and "processor" both refer to devices comprising a processing unit (e.g., a central processing unit) and some form of memory (e.g., a non-transitory tangible computer-readable storage medium) for storing a program which is executable by the processing unit. A controller 30 may take any suitable form, including (but not limited to) a computer or processor. A single controller 30 may be used in connection with the whole of the production environment 10. Alternatively, respective controllers 30 may be associated with individual safety zones 28, such as associated with an assembly line 14, a fixed safety zone 32, and/or a movable safety zone 34.

As used herein, a defined safety zone 28 is a three-dimensional volume of space, within which a potential hazard to a person may exist at least during some period of time. A defined safety zone 28 may be fixed in space, insofar as the safety zone 28 does not move relative to the production environment 10. In FIG. 1, a fixed safety zone 32 is schematically illustrated by the dashed box encompassing the assembly line 14. However, a defined safety zone 28 also may be movable in space, for example, such that it moves together with the vehicle 16 or the assembly line 14, and/or with any other structure associated with the production environment 10. In FIG. 1, various movable safety zones 34 are schematically illustrated by the dashed boxes associated with the vehicle 16 that moves along the assembly line 14. Moreover, a movable safety zone 34 may be defined at any desired moment in time. For example, as schematically illustrated in FIG. 1, vehicle 16 initially only has a single safety zone 28 in the form of a movable safety zone 34 associated with a single sensing device 24; however, an additional movable safety zone 34 is established at the third representation of vehicle 16, and two additional fixed safety zones 32 are established at the fourth representation of vehicle 16.

Additionally or alternatively, the safety system 12 may include one or more tags 36 (or other markers) that are worn by personnel. A sensing device 24 may be configured to detect the presence of a tag 36 within a safety zone 28 and/or a sub-zone thereof. For example, a tag 36 may be associated with a person that is authorized to work within a given safety zone 28, such as user 38. A tag 36 may take any suitable form such that a sensing device 24 is configured to detect its presence within a safety zone 28. For example, the tag 36 may be a radio-frequency identification (RFID) tag and the sensing device 24 may be an RFID reader. In FIG. 1, a tag 36 is schematically illustrated as being incorporated in a helmet 40 worn by the user 38 within the safety zone 28 associated with the assembly line 14. Similarly, a tag 36 also is schematically illustrated in the form of a neck-worn badge 44 worn by the person 26. Tags may also be attached to tools used in the production environment 10, as is described in more detail below.

Various aspects of the production environment 10 may be altered in response to a sensing device 24 detecting the presence or imminent entry of a person or tool in a defined safety zone 28. For example, the movement of vehicle 16 and/or assembly line 14 may be altered in response to various detections by a sensing device 24. As an illustrative, non-exclusive example, the movement of vehicle 16 or assembly line 14 may be slowed or stopped. Then, upon detection of the absence of the person or tool within the defined safety zone 28, the movement of the vehicle 16 and/or assembly line 14 may be automatically returned to a default configuration, such as corresponding to a default speed.

Additionally, the production environment 10 and/or a safety system 12 includes one or more alarm systems 46 that are configured to be activated upon various detections by a sensing device 24. For example, an alarm system 46 may include one or more of an audible alarm 48 and/or a visible alarm 50. In FIG. 1, two alarm systems 46 are schematically presented, including an alarm system 46 associated with assembly line 14 and an alarm system 46 associated with the whole of the production environment 10. For example, if a person 26 enters a safety zone 28, one or both of the audible alarm 48 and/or the visible alarm 50 may be activated to alert the person 26 or other personnel that the person 26 has entered the safety zone 28. Additionally or alternatively, different degrees of alarm may be configured based on the extent of entry into a safety zone 28. Then, upon retreat by the person 26 out of the safety zone 28, the alarm system 46 may be deactivated, or otherwise cease to emit one or both of an audible alarm 48 and/or a visible alarm 50.

The production environment 10 partly depicted in FIG. 1 further includes an inventory control system 52, for example, an inventory control system 52 that is configured to track the location of parts 54 within the production environment 10. For example, the inventory control system 52 may utilize RFID tags 56 associated with parts 54 and/or location awareness system features 58 associated with parts 54. Illustrative, non-exclusive examples of location awareness system features 58 that may be utilized with or otherwise implemented with an inventory control system 52 include (but are not limited to) pseudo-satellite (pseudolite) augmented global positioning system (GPS) features, laser-based tracking system features, etc. The controller 30 may be configured to automatically alter an aspect of the production environment 10 responsive to the detection by a sensing device 24 of the presence or movement of a predetermined part 54 (e.g., a tool) within a defined safety zone 28.

This disclosure proposes improvements in safety systems for use in vehicle production environments. In accordance with some embodiments, the safety system includes a multiplicity of active positioning sensors (e.g., active or passive RFID devices, smartphones or watches, blue-tooth device, etc.). The sensors are configured to detect the presence of an object at a particular distance from or within a particular area or volume of space. The safety system further includes a controller that is configured to receive sensor data from the multiplicity of sensors and use that sensor data to calculate the virtual location of each sensed object relative to a virtual two- or three-dimensional (2-D/3-D) computer-aided design (CAD) map of the as-built aircraft design. More specifically, the controller calculates the virtual location of a sensed object in the frame of reference of the sensor network and then determines whether that virtual location is within a virtual safety zone having a known location and extent in the frame of reference of the sensor network. In response to detection of the presence of an object in unacceptable proximity to the vehicle or within a particular safety zone of the vehicle, an alarm is activated and the planned build process is altered, e.g., by blocking electrification of electrical equipment onboard the vehicle. More specifically, the controller measures the distance separating the object from electrified areas of the vehicle and then issues a control signal that engages a lock-out of the next scheduled "power-on" phase of the vehicle build process. In addition, safety personnel may be dispatched to the vehicle to recover tools that are out of place.

Figure 2:
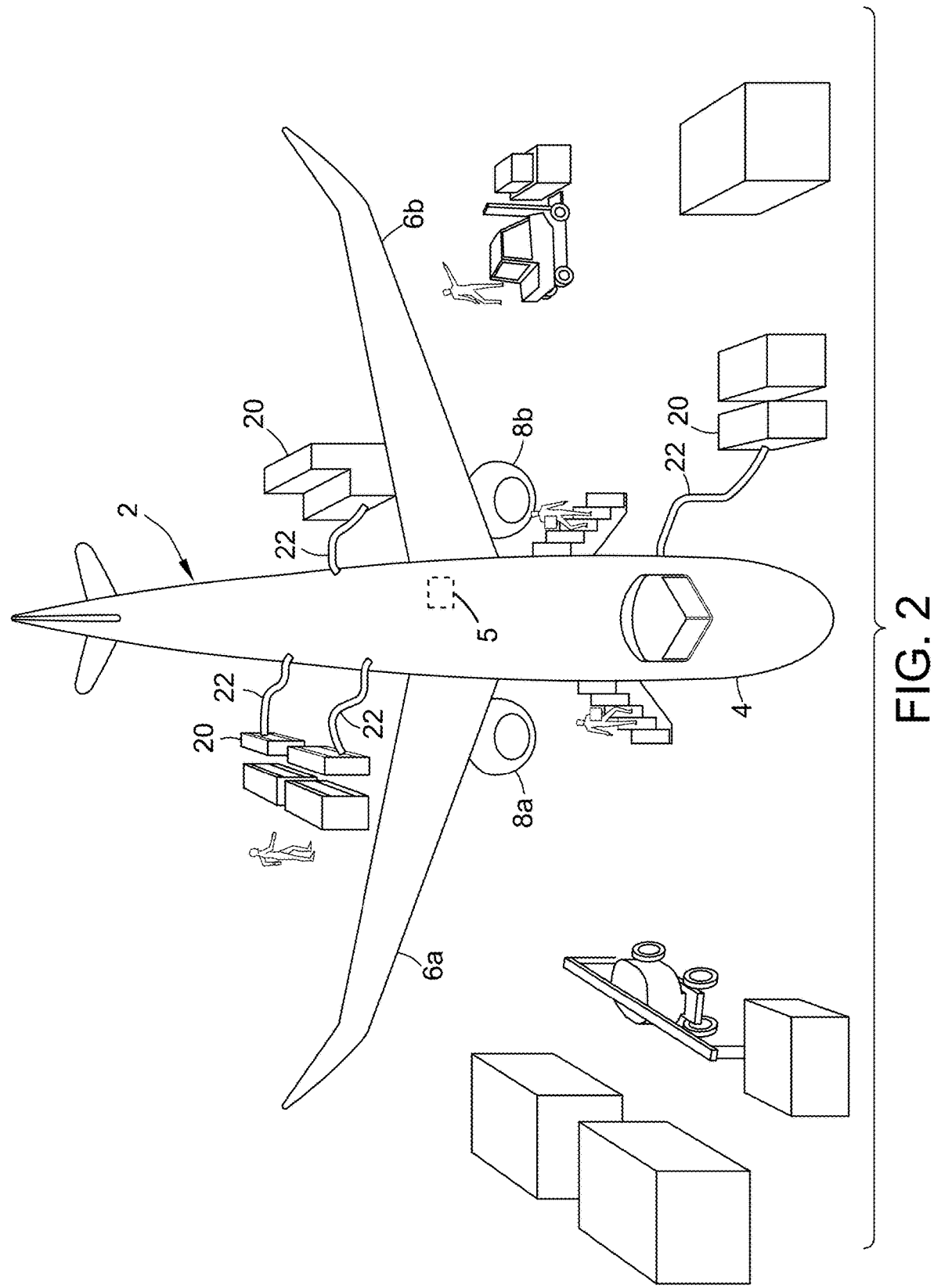
FIG. 2 is a diagram representing a three-dimensional view of an aircraft during production using a safety system that includes tool boxes connected to the aircraft power system to prevent electrification when tools are missing from the tool box.

FIG. 2 is a diagram representing a three-dimensional view of an aircraft 2 during production using a safety system that includes tool boxes 20 connected to the aircraft power system via electrical cables 22 to prevent electrification when tools are missing from a tool box. In the stage of production depicted in FIG. 2, the aircraft 2 includes a fuselage 4, a pair of wings 6a and 6b extending laterally outward from the fuselage 4, and a pair of engines 8a and 8b respectively mounted to the wings 6a and 6b. The aircraft 2 includes electrical equipment 5. During production, tests are performed indoor with aircraft electrical power on.

In accordance with one embodiment, each tool box 20 includes proximity sensors (not shown in FIG. 2) which detect the presence of tools registered for storage in the tool box 20. The tool box further includes a circuit breaker (not shown in FIG. 2) by which the source of electrical power during testing may be disconnected from the aircraft power system. The safety system further includes respective processors (incorporated within or connected to the tool boxes 20) which process sensor data received from the proximity sensors inside the tool boxes 20 and control the states of the circuit breakers. For example, if a tool is missing from its assigned location inside the tool box 20, the associated proximity sensor at the assigned location detects the absence of the missing tool, in response to which the processor triggers the circuit breaker to open, thereby preventing electrification of the aircraft power system.

Figure 3:
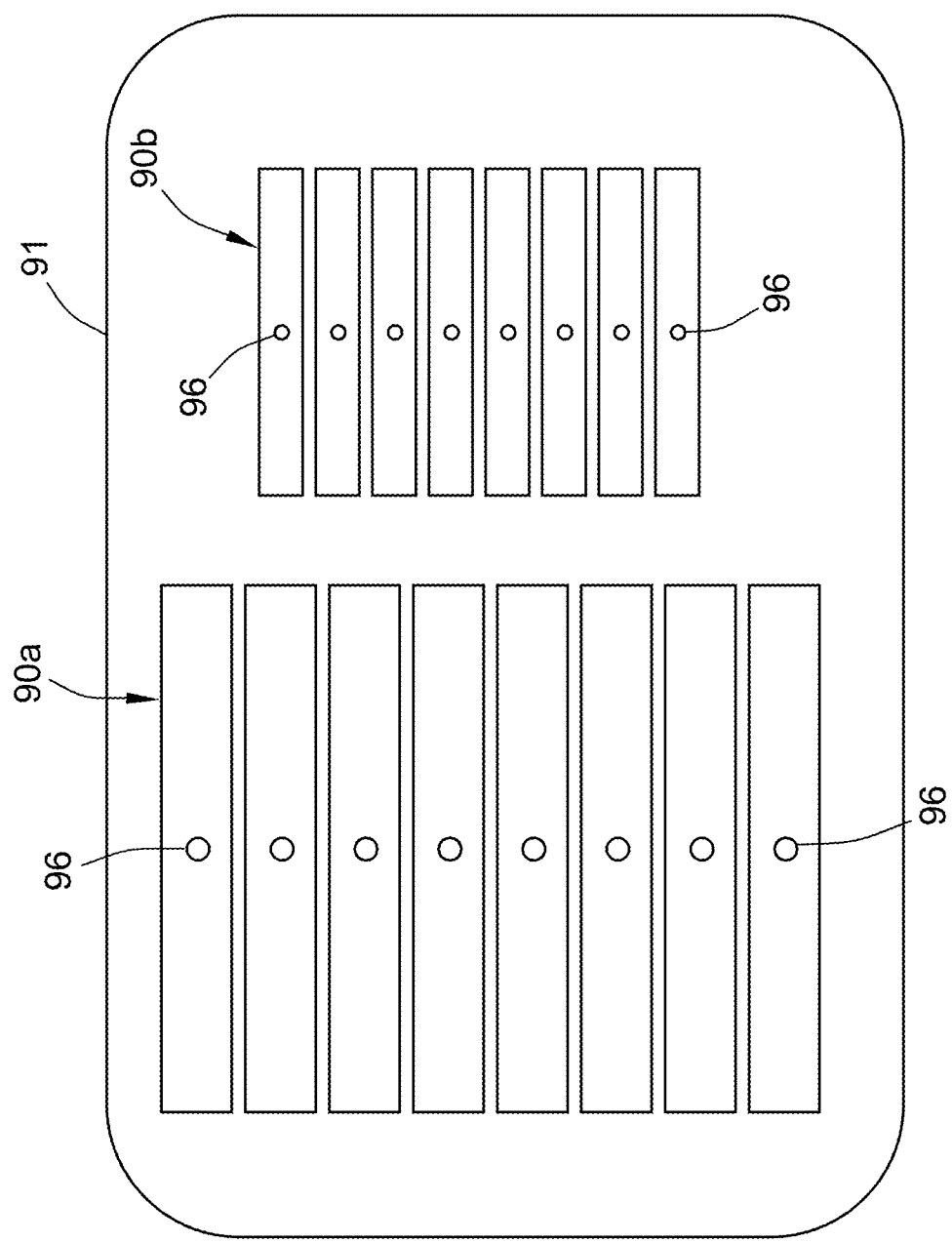
FIG. 3 is a diagram representing a top view of a pad with cavities configured to receive respective tools for storage, each cavity having a proximity sensor configured and positioned to detect the presence of the tool in the cavity.

FIG. 3 is a diagram representing a top view of a pad 91 (e.g., made of semi-rigid foam material) with cavities 90a and 90b configured to receive respective tools for storage. Each cavity (also referred to herein as a "nest") has a proximity sensor 96 configured and positioned to detect the presence of the tool in the cavity.

Figure 4:
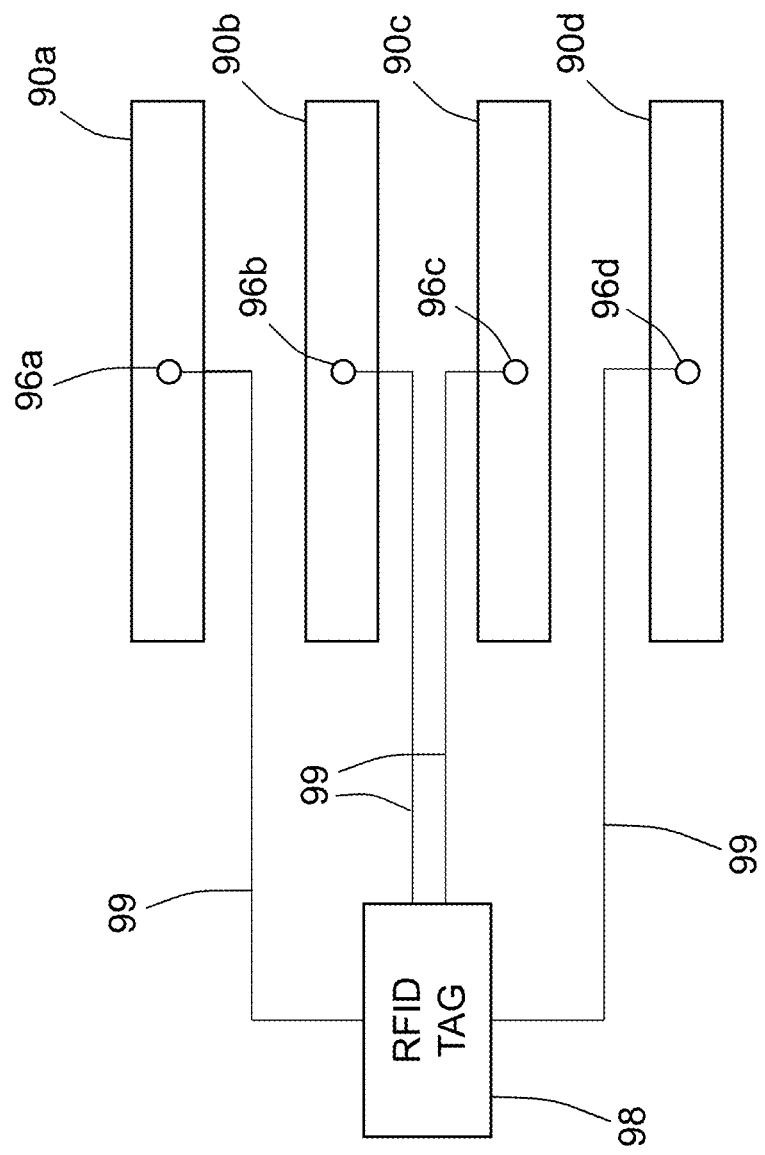
FIG. 4 is a diagram representing an RFID tag connected to a plurality of proximity sensors arranged to detect the presence of tools in cavities of a pad placed inside a tool box.

FIG. 4 is a diagram representing an RFID tag 98 connected (via electrical wires 99) to a plurality of proximity sensors 96a-96d arranged to detect the presence of tools in cavities 90a-90d of a pad 91 placed inside a tool box 20. The RFID tag 98 includes a processor (e.g., a microprocessor) and a non-transitory tangible computer-readable storage medium for storing digital data representing the identity of the tool box 20, the identities of the tools designated for storage in the respective cavities 90a and 90b, and the states of the proximity sensors 96. The information recorded inside the RFID tag 98 may be read periodically by an RFID reader which is mounted inside or outside the tool box 20, which RFID reader in turn is communicatively coupled to the processor that controls the state of the circuit breaker.

Prior to power-up, a check is performed wherein all tools and devices must be accounted for. This can be accomplished by electronically monitoring proper tool placement in tool storage areas. Each nest or cavity 90 that holds a tool 18 has a proximity sensor 96 (or a mechanical sensor) that senses tool presence. If a tool or equipment is not returned, the tool box 20 acts like a cut-off switch to alert personnel. In rare or extreme cases, the system can be overridden once precautions have been taken or the particular tool/equipment has been accounted for.

Figure 5A:
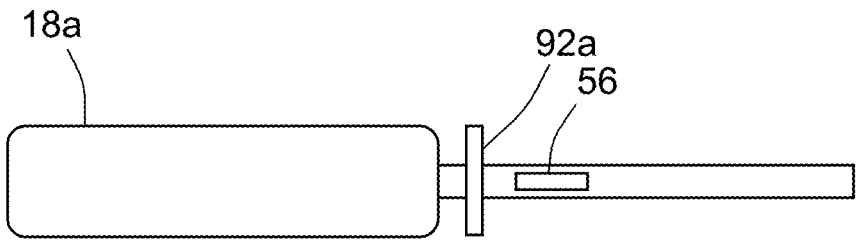
FIG. 5A is a diagram representing a top view of a tool equipped with an RFID tag and a mechanical key having a first shape for preventing improper placement in a cavity.
Figure 5B:
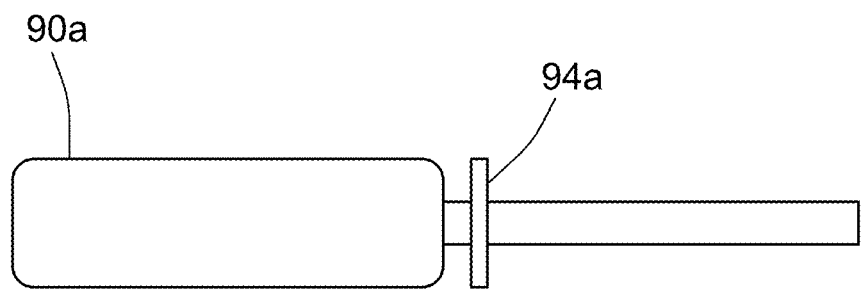
FIG. 5B is a diagram representing a top view of a cavity configured to receive the tool depicted in FIG. 5A for storage.
Figure 5C:
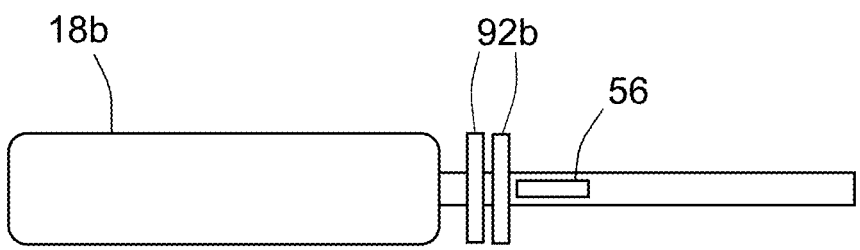
FIG. 5C is a diagram representing a top view of a tool equipped with an RFID tag and a mechanical key having a second shape for preventing improper placement in a cavity, the second shape being different than the first shape depicted in FIG. 5A.
Figure 5D:
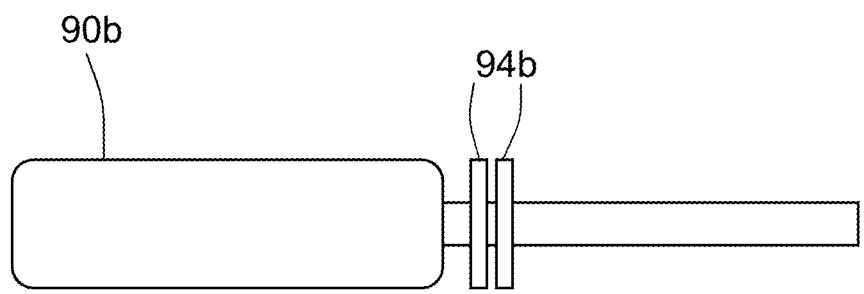
FIG. 5D is a diagram representing a top view of a cavity configured to receive the tool depicted in FIG. 5C for storage.

Cavities 90 may be shaped to accept a specific tool 18 that is keyed for the cavity. FIG. 5A is a diagram representing a top view of a tool 18a equipped with an RFID tag 56 and a mechanical key 92a having a first shape for preventing improper placement in a cavity. FIG. 5B is a diagram representing a top view of a cavity 90a configured to receive the tool 18a depicted in FIG. 5A for storage. In particular, the cavity 90a includes a key cavity 94a which is shaped to receive the mechanical key 92a. FIG. 5C is a diagram representing a top view of a tool 18b equipped with an RFID tag 56 and a mechanical key 92b having a second shape for preventing improper placement in a cavity. FIG. 5D is a diagram representing a top view of a cavity 90b configured to receive the tool 18b depicted in FIG. 5C for storage. In particular, the cavity 90b includes a key cavity 94b which is shaped to receive the mechanical key 92b. The second shape of mechanical key 92b is sufficiently different than the first shape of mechanical key 92a depicted in FIG. 5A so that it is not possible to either seat tool 18a in cavity 90b or seat tool 18b in cavity 90a. This feature prevents misplacement of tools inside the tool box. Each RFID tag 56 includes a non-transitory tangible computer-readable storage medium that stores digital data representing the unique identity of the tool to which the RFID tag 56 is attached. The RFID can also help locate improperly placed tools. If the check reveals that tools are missing or misplaced, a search for the missing or misplaced tool is initiated. In addition, the electrification process is forestalled in order to protect humans and prevent damage to the aircraft due to foreign object debris (FOD).

Figure 6:
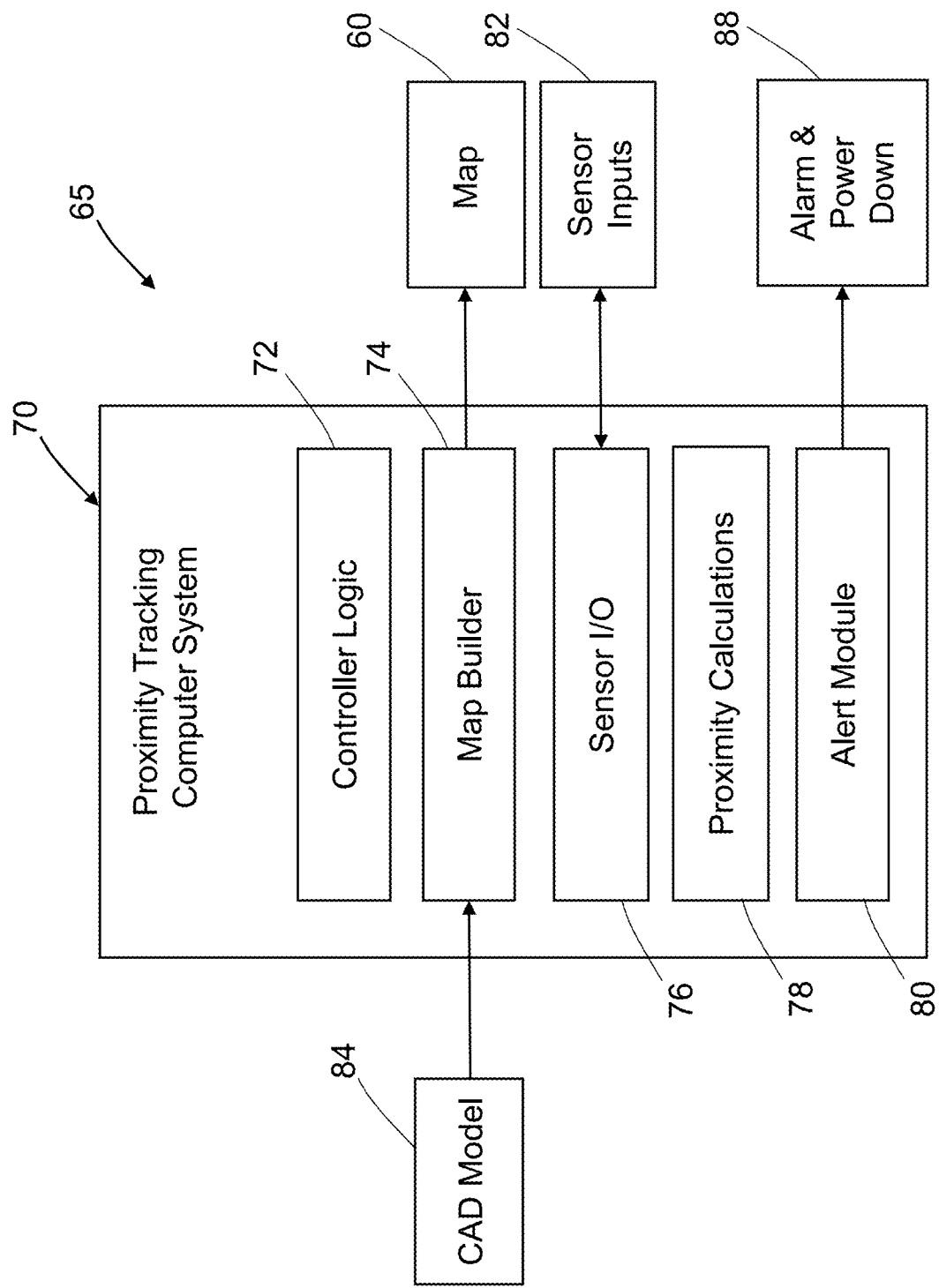
FIG. 6 is a block diagram identifying components of a system for tracking objects in a vehicle production environment, including software components of a proximity tracking computer system in accordance with one embodiment.

In addition, the safety system proposed herein is further able to provide an automated notification to appropriate safety personnel that a metallic tool is near an electrical panel or in close proximity to wires that would be electrified during an aircraft power-up procedure. FIG. 6 is a block diagram identifying components of a system 65 for tracking objects in a vehicle production environment, including software components of a proximity tracking computer system 70 configured to determine the virtual locations of humans and/or tools relative to virtual safety zones assigned to a vehicle (e.g., an aircraft) in production in accordance with one embodiment. The misplaced tools may be metallic or non-metallic (e.g., tools made by additive manufacturing). The proximity tracking computer system 70 includes one or more processors for executing instructions of a safety check procedure (e.g., a foreign object debris check algorithm) in accordance with controller logic 72. The proximity tracking computer system 70 further includes a sensor input/output module 76 that receives sensor inputs 82 during execution of the check procedure. The proximity tracking computer system 70 further includes a map builder module 74 which is configured to construct a digital map 60 defining a virtual vehicle and virtual safety zones relative to a virtual frame of reference of a sensor network. The map building algorithm is invoked before the check procedure is initiated. The CAD model 84 is in the form of digital 3-D structural data and part identification metadata retrieved from a database and sent to the proximity tracking computer system 70 by a database server (not shown in FIG. 6). The proximity tracking computer system 70 further includes a proximity calculations module 78 which is configured to calculate the virtual location of a sensed object (e.g., a human or a tool) in the coordinate system of the sensor network based on sensor inputs 82 during the check procedure. The proximity calculations module is further configured to estimate an actual distance separating the object from a hypothetical geometric boundary in physical space corresponding to the virtual safety zone by calculating a virtual distance separating the virtual location of the object from the virtual safety zone in the digital map. The resulting proximity value is sent to an alert module 80 which is configured to determine whether the resulting proximity value is greater than a specified alert threshold or not. If the alert module 80 determines that the resulting proximity value is greater than the specified alert threshold (e.g., indicating that a metal tool is in proximity to electrical equipment), then the alert module 80 issues an alarm signal 88 that triggers activation of alarm devices and lock-out of the next scheduled "power-on" phase of the vehicle build process. Optionally, the alert module 80 is also configured to initiate a request to the inspection department to ensure that the aircraft has not been damaged. If the alert module 80 determines that the resulting proximity value is not greater than the specified alert threshold, then the alarm signal 88 is not issued.

Figure 7:
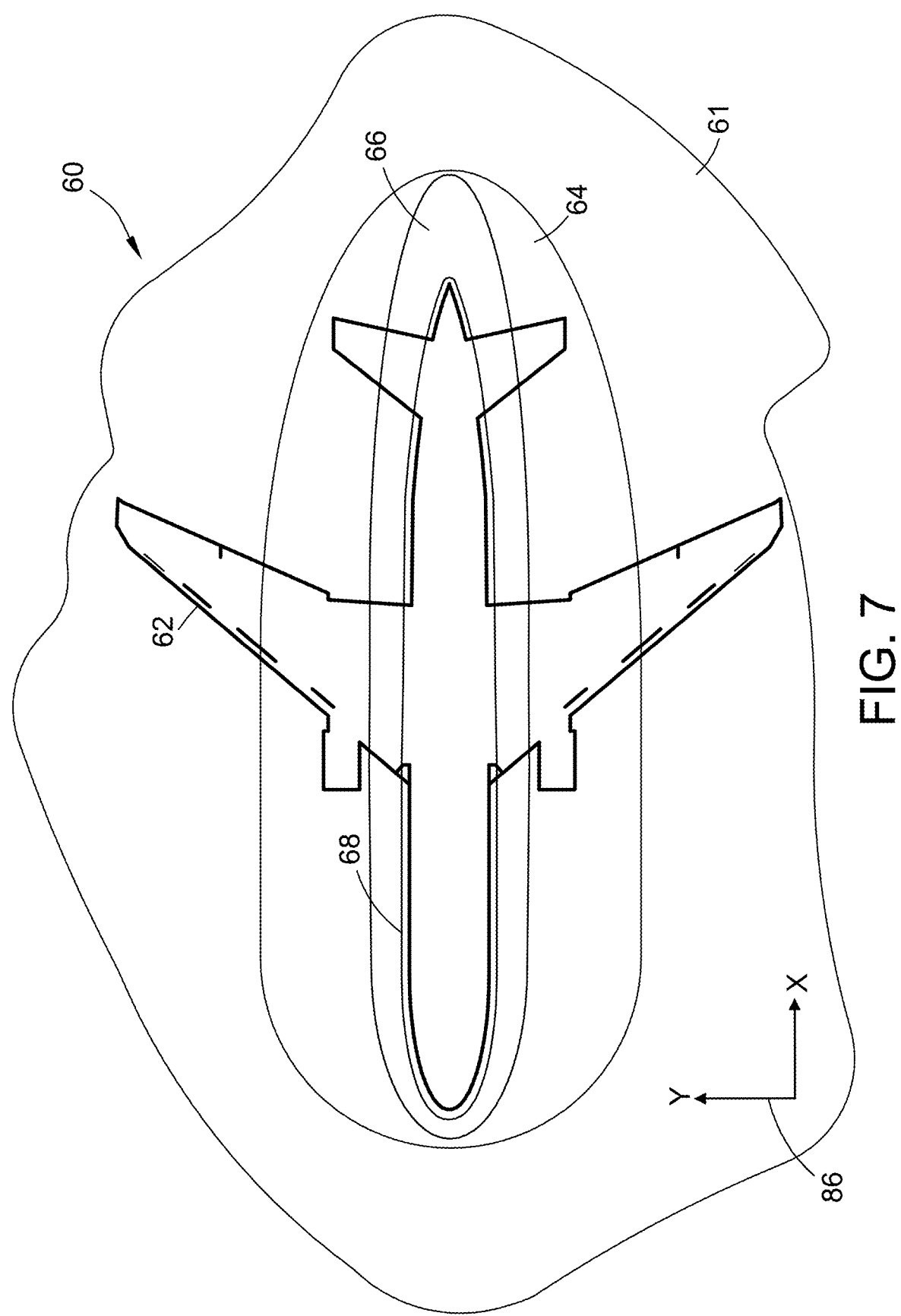
FIG. 7 is a diagram representing a virtual map showing a virtual aircraft surrounded by a plurality of mutually offset virtual safety zones.

FIG. 7 is a diagram representing a digital map 60 generated using the system depicted in FIG. 6. The digital map 60 may include differently colored zones representing a virtual boundary 62 of a vehicle (e.g., an aircraft) surrounded by a plurality of prioritized, mutually offset virtual safety zones 64, 66 and 68, which zones are further surrounded by a space 61 with locations defined by a coordinate system 86 of a sensor network. (As used herein, the term "virtual boundary" means a boundary simulated on a computer as opposed to a physical boundary.) The digital map 60 may be two- or three-dimensional. The following description assumes that the digital map 60 is three-dimensional (3-D). The digital map 60 is constructed by the map builder module 74 and displayed on a display screen. The digital map 60 is derived from the "as-built" configuration of the aircraft as defined by the CAD model 84. The digital map 60 may be "dynamically" derived in the sense that the shape and extent of the virtual safety zones may be modified at different stages of the production cycle.

In the example depicted in FIG. 7, the high-priority virtual safety zone 68 represents a volume of space that is coextensive with the fuselage of the virtual aircraft 62. The medium-priority virtual safety zone 66 is contiguous with and outwardly offset from (surrounds) the high-priority virtual safety zone 68. The low-priority virtual safety zone 64 is contiguous with and outwardly offset from (surrounds) the medium-priority virtual safety zone 66. Each of the virtual safety zones 64, 66 and 68 has a respective alert level associated therewith. If the presence of a tool in the low-priority virtual safety zone 64 is detected, then a low-level alert is issued; if the presence of a tool in the medium-priority virtual safety zone 66 is detected, then a medium-level alert is issued; if the presence of a tool in the high-priority virtual safety zone 68 is detected, then a high-level alert is issued.

In accordance with one embodiment, the virtual safety zones are created by extracting data from the CAD model 84 in the XYZ master coordinate system of the sensor network, sorting by the Joint Aircraft System/Component Code Table (hereinafter "JASC Code Table) and creating a convex hull algorithm (volume) of the components. The JASC Code Table is a modified version of the Air Transport Association of America, Specification 100 code. It was developed by the Federal Aviation Administration's Regulatory Support Division. This code table is constructed by using a JASC code four-digit format, along with an abbreviated code title. This table can be used as a quick reference chart, to assist in the coding and review of aircraft structures or systems data. When creating the mapped zones, the process flow is as follows:

(1) All of the 3-D parts for the particular model aircraft build are extracted from the CAD database; including the metadata and attributes attached to them.

(2) The attributes are filtered using the JASC code table for the area of interest. For example, system JASC code 32, which is the Fuselage Structure, defines the basic shape of the aircraft. The 3-D coordinates of these parts can be extracted from the CAD assembly or part and aggregated together to form the complete initial volume of the high-priority virtual safety zone 68 (e.g., colored red on a display screen).

(3) Next, a second volume is offset outwardly by a fixed virtual distance (e.g., 5' or 10') from the volume created in step 2 to create the larger nested volume of the medium-priority virtual safety zone 66 (e.g., colored yellow on the display screen).

(4) Finally, a third volume is offset outwardly by a larger fixed virtual distance (e.g., 20', 25', 30', etc.) from the volume created in step 2 to create the even larger nested volume of the low-priority virtual safety zone 64 (e.g., colored green on the display screen).

The example just described is a notional embodiment. Alternatively, other JASC code can be used to create volumes of space as needed to create 3-D safety zones around particular aircraft systems (e.g., electrical systems or engines) as opposed to the entire fuselage.

The map builder module 74 has the ability to derive plural safety zones that are not contiguous (e.g., the avionics bay and the aft landing gear), but are defined to have the same urgency and priority (thus treating the plural safety zones as a single safety zone). In addition, map builder module 74 create 3-D nested zones which are governed by programmable rules that act in safety response modes of increasing priority (e.g., warning→warning tone/noise→stop the production line). The rules may be customized and changed dynamically to meet changing needs, changing safety procedures and changing 3-D aircraft shapes (e.g., engineering changes).

Figure 8:
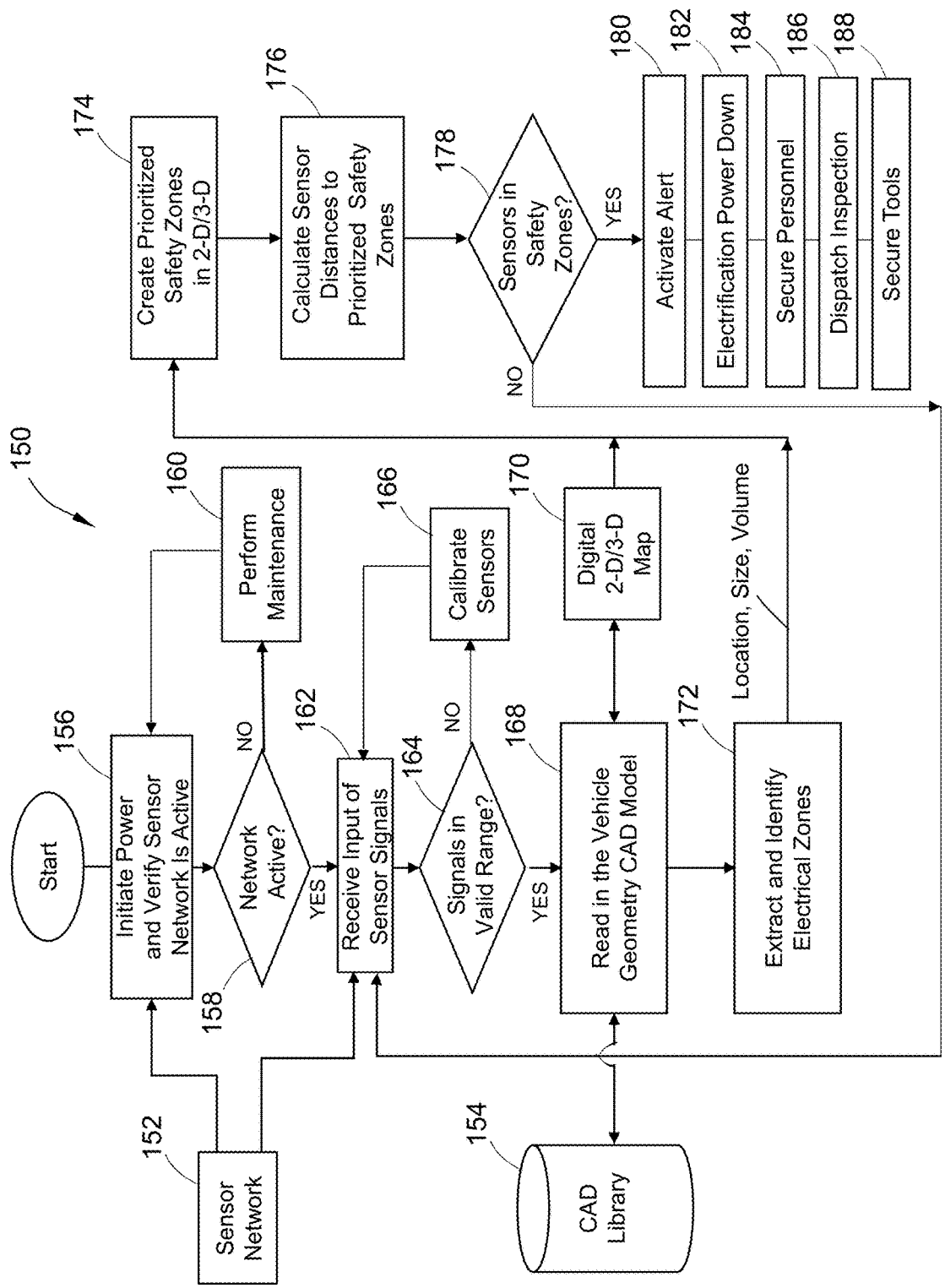
FIG. 8 is a flowchart identifying steps of a method for tracking objects (e.g., personnel and/or tools) in an aircraft production facility in accordance with one embodiment.

The proximity tracking computer system 70 receives sensor inputs 82, such as inputs from RFID tags 36 and 56, from a sensor network. The sensor inputs 82 are used to determine the virtual location of an object relative to the virtual safety zones that form the digital map 60. FIG. 8 is a flowchart identifying steps of a method 150 for tracking objects (humans and/or tools) in an aircraft production facility in accordance with one embodiment. At the start, electrical power is supplied to a sensor network 152 and then the proximity tracking computer system 70 initiates a process for verifying that the sensor network 152 is active (step 156). During the verification process, the proximity tracking computer system 70 determines whether the sensor network 152 is active or not (step 158). On the one hand, if a determination is made in step 158 that the sensor network 152 is not active, then maintenance is performed (step 160). Upon completion of the maintenance procedure, the process returns to step 156. On the other hand, if a determination is made in step 158 that the sensor network 152 is active, then the proximity tracking computer system 70 begins receiving signals from the sensor network 152 (step 162). The proximity tracking computer system 70 then determines whether the signals from the sensor network 152 are within a valid range or not (step 164). On the one hand, if a determination is made in step 164 that the signals from the sensor network 152 are not within a valid range, then the sensors are calibrated (step 166). On the other hand, if a determination is made in step 164 that the signals from the sensor network 152 are within a valid range, then the controller logic 72 sends a control signal instructing the map builder module 74 to construct a digital map 60.

All devices in the sensor network 152 (and the aircraft) are registered to the system so that the devices (and the aircraft) are in the master coordinate system of the sensor network. The locations of objects are determined with reference to the master coordinate system of the sensor network. The sensors include RFID tags, RFID readers, transmitters and receivers (e.g., GPS receivers). While some sensors may be fixed, some of the objects with attached sensors are moving (e.g., personnel and tools).

In response to that control signal, the map builder module 74 retrieves CAD vehicle model data from a CAD library stored in a non-transitory tangible computer-readable storage medium of a vehicle model database server 215 (step 168), which CAD model data includes information regarding the geometry of the vehicle being produced (in this example, an aircraft). The map builder module 74 then constructs a digital map (in two or three dimensions) representing virtual boundaries of the vehicle in production and components thereof using the retrieved CAD vehicle model data and safety specifications (step 170). For example, a safety specification may dictate safe distances of metal tools from electrical equipment such as cables, computers, electrical devices and electro-mechanical devices. In addition, the map builder module 74 extracts and identifies specific zones (e.g., subsystems or components) of concern within the vehicle (step 172), including location, size and volume of each zone. In the example depicted in FIG. 8, the zones of concern are zones that contain electrical equipment, which equipment will be electrified when vehicle power is turned on. The map builder module 74 then uses the digital map of the vehicle and the location, size and volume of the zones of concern to create a digital map 60 that includes prioritized virtual safety zones (step 174). In an alternative embodiment, the digital map 60 may be created prior to the receipt of signals from the sensor network 152.

The proximity tracking computer system 70 uses the sensor inputs 82 to determine the virtual locations of objects relative to the virtual safety zones during execution of a foreign object debris check procedure prior to electrification of the vehicle for testing purposes. More specifically, the proximity calculations module 78 estimates an actual distance D separating the object from a hypothetical geometric boundary in physical space corresponding to a virtual safety zone by calculating a virtual distance separating the virtual location of the object from the virtual safety zone in the digital map (step 176). The alert module 80 then determines whether the object is within a safety zone or not (step 178). If the object is located outside the safety zone, then the distance separating the object from the safety zone will be a positive value; if the object is located within the safety zone, then the distance separating the object from the safety zone will be a negative value. On the one hand, if a determination is made in step 178 that the object is not within a safety zone, then the process returns to step 162. On the other hand, if a determination is made in step 178 that the object is within a safety zone, then a series of events occur, including: activation of an alert (step 180); lock-out of the next scheduled "power-on" phase of the vehicle build process (step 182); initiation of a procedure to secure all personnel (step 184); dispatch of technicians to inspect the vehicle (step 186); and initiation of a procedure to secure all tools and equipment (step 188).

To secure all tools and equipment in a production environment, the safety system in accordance with some embodiments relies on mobile smart devices which have the ability to receive and transmit tracking information received from active positioning sensors. For example, production personnel may be equipped with smartphones or smart watches programmed with applications that enable the smartphone or smart watch to communicate with an RFID reader, which RFID reader in turn may be communicatively coupled to active or passive RFID tags attached to portable tools or other equipment.

Figure 9:
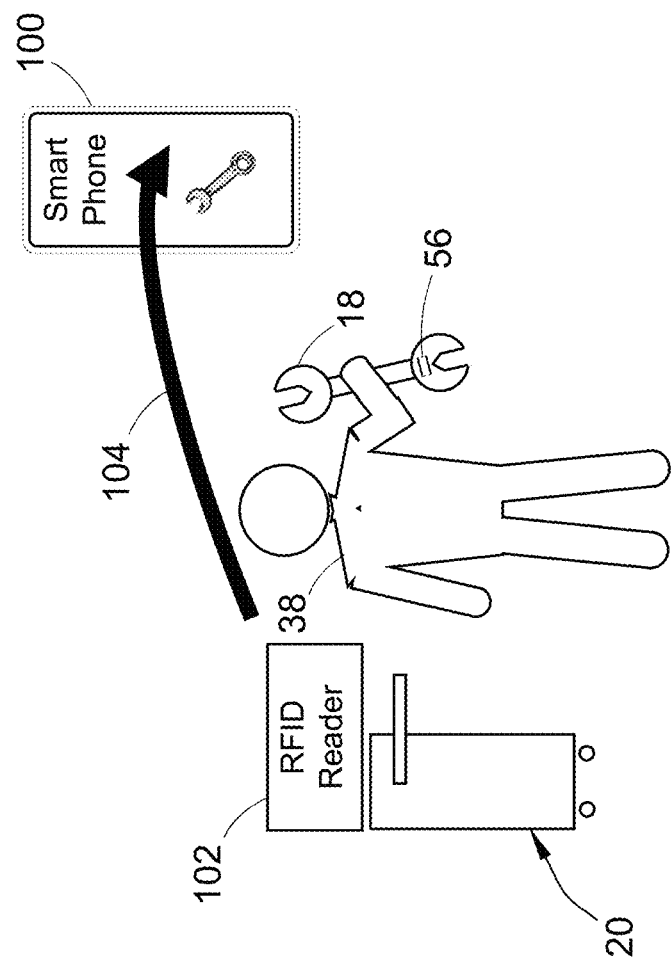
FIG. 9 is a diagram representing the act of using a smartphone to register a tool in the possession of the smartphone user.

FIG. 9 is a diagram showing a user 38 holding a tool 18 which has been removed from a tool box 20. The safety system includes an RFID reader 102 which is shown attached to the tool box 20, but which may, in the alternative, be incorporated inside the tool box 20. The RFID reader 102 is capable of reading an RFID tag 98 of the type depicted in FIG. 4. For example, when the user 38 removes the tool 18 from the tool box 20, that event is recorded in the RFID tag 98 shown in FIG. 4 along with an identifier that identifies the removed tool 18. This information is then communicated to the RFID reader 102 (see FIG. 9), which in turn communicates the identity of the tool 18 to a smartphone 100 via a wireless channel 104, e.g., via Bluetooth. (Bluetooth is a wireless technology standard for exchanging data between fixed and mobile devices over short distances using short-wavelength UHF radio waves in the industrial, scientific and medical radio bands, from 2.400 to 2.485 GHz, and building personal area networks.) When the user picks up a tool 18 with an RFID tag 56, the user's smartphone 100 registers the tool in possession. The smartphone 100 hosts an application that is configured to record information about the user, a list of the tools or equipment in the user's possession, the work area or bay, the aircraft or vehicle being worked on, etc. The smartphone 100 is connected wirelessly to the factory network (e.g., using wireless local area network (LAN) technology).

In accordance with an alternative embodiment, the smartphone 100 (or a tablet) may be configured to scan the tool directly using commercially available RFID readers designed to be coupled to a smartphone. For example, an RFID sled is commercially available that enables users of smartphones and other mobile devices to read ultrahigh-frequency RFID tags by connecting their Android or iOS devices to the reader via Bluetooth. To operate the device, a user may either attach a compatible phone to the RFID sled by simply sliding the phone onto the sled's top, or carry it on his or her person. The reader captures UHF RFID data from standard UHF tags when in range, and that information is then transmitted to the user's mobile phone or tablet which is communicatively coupled to that reader, e.g., via a Bluetooth connection. The RFID sled can automatically store the collected read data until the smartphone is within range. The phone or tablet could then forward that information to a server via a wireless LAN, cellular or Bluetooth connection. The RFID sled can also be placed in a Geiger counter mode. A user would then input the identity of the missing tool which is sought using software on the smartphone 100 (or tablet). That instruction is then transmitted to the RFID sled, which the user may then carry in search of a tool. During this search, the RFID sled would seek a specific tag ID number and emit an audible tone when the missing tag is in range.

RFID reader technology also exists which enables a user to determine the location of a tag in three dimensions within a few centimeters. Most standard hand-held RFID readers use received signal strength indicator technology to identify where a tag may be located. In addition, some devices also utilize time domain phase difference of arrival, which consists of collecting and analyzing the sequence of data points in successive order as a reader is moving. The reader is capable of interrogating each tag hundreds of times per second. This enables a user to differentiate whether the missing tag is located forward, rearward or to one side of the reader. The hand-held FRID reader is also capable of emitting sound alerts as the distance separating the reader from tag decreases or increases, and display location data on the smartphone or tablet screen.

Figure 10:
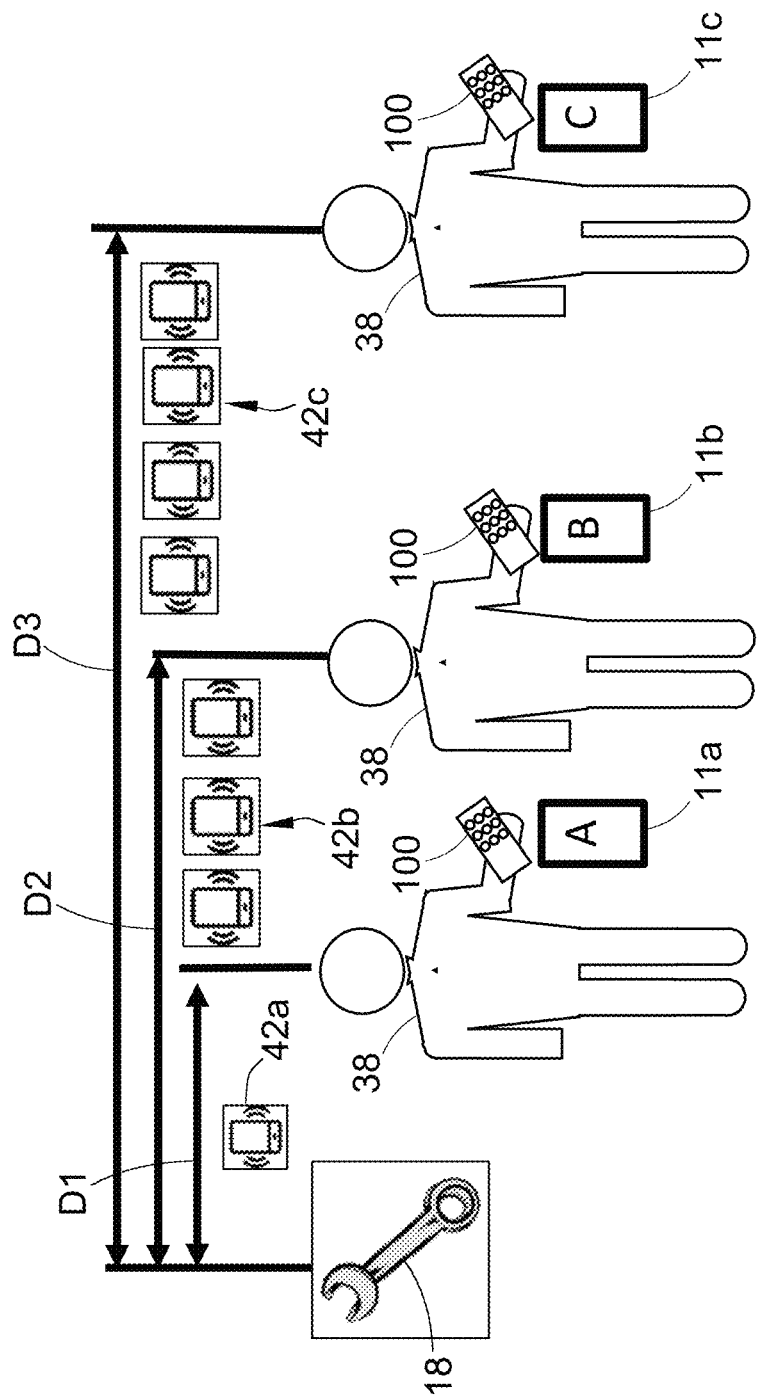
FIG. 10 is a diagram representing stages in the operation of a smartphone that issues alerts of increasing intensity as the separation distance from a registered tool increases.

FIG. 10 is a diagram representing stages in the operation of a smartphone 100 that issues alerts of increasing intensity as the distance separating the smartphone 100 from a registered tool 18 increases. If the user 38 leaves the tool 18 anywhere and walks away—the smartphone 100 records the last position of tool 18 and notifies the user 38 via first, second and third alerts 42*a*-42*c* in the form of ringtones or vibrations, the intensities or frequencies of which increase as the separation distance increases from D1 to D2 to D3. In addition, the smartphone 100 sends corresponding alert messages to the proximity tracking computer system 70 (not shown in FIG. 10), which is configured to selectively activate lights 11*a*-11*c* of a visual warning system. When activated, lights 11*a*, 11*b* and 11*c* produce light of different colors A, B and C, respectively. In accordance with one proposed implementation, color A is green, color B is yellow and color C is red.

Figure 11:
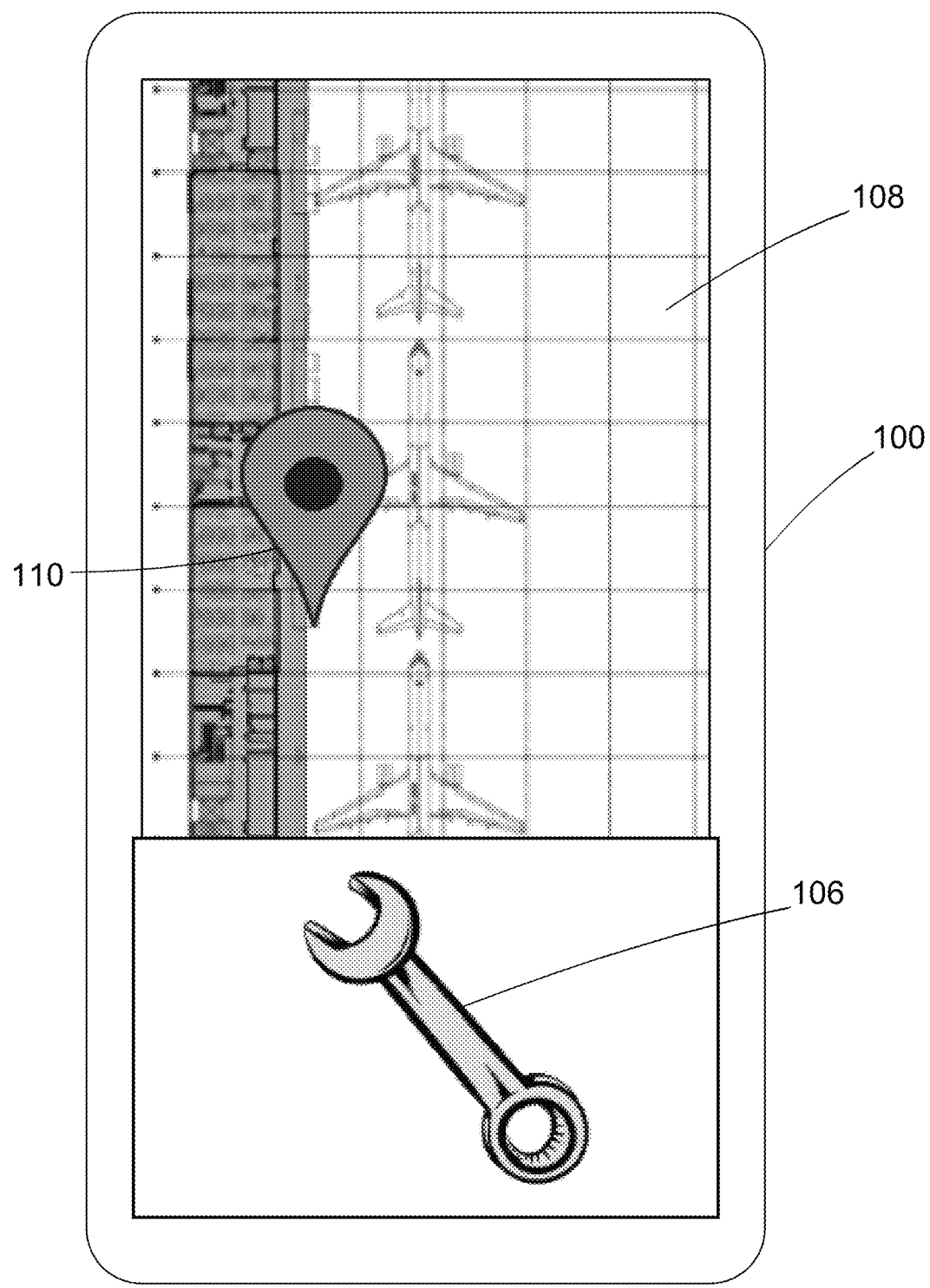
FIG. 11 is a diagram representing a view of a smartphone displaying the last logged location of a tool on a map of a production facility.

If the user 38 is out of sensing range or forgets where he/she left the tool 18, the smartphone 100 displays the last known or logged location before going out of range. FIG. 11 is a diagram representing a view of a smartphone 100 displaying a tool icon 106 in one window and displaying a tool location symbol 110 on a map 108 of the production facility in another window. The tool location symbol 110 points to the last logged location of the tool on the map 108. If the tool has been moved, the RFID reader to which the smartphone 100 is coupled will scan a surrounding area until the tool is within range as user 38 moves toward the last known location of the tool. If the tool is not found, then the smartphone 100 is configured to issue a FOD alert, in response to which the alert module 80 of the proximity tracking computer system 70 disables the aircraft power-up function.

RFID-enabled mobile electronic devices other than a smartphone may be employed. For example, an RFID-enabled smart watch or notebook configured to measure a distance separating the tool from the mobile electronic device may be employed. The various RFID-enabled mobile electronic devices may be employed in a method for tracking objects in a vehicle production environment. First, a tool is registered in a non-transitory tangible computer-readable storage medium of the mobile electronic device. Then the tool and the mobile electronic device are carried by a user in the vehicle production environment. After the tool has been used, the user may place the tool at a first location in the vehicle production environment. When the user moves to a second location, the user may forget the tool at the first location. In this instance, the user may carry the mobile electronic device away from the first location where the tool was placed. As the user moves away from the first location, the mobile electronic device measures the distance separating the tool from the mobile electronic device. An alert device incorporated in the mobile electronic device is activated when the measured distance equals a first specified threshold. Then a wireless communication is sent to a proximity tracking computer system when the measured distance equals a second specified threshold greater than the first specified threshold. In response to this wireless communication, the proximity tracking computer system alters an aspect of the vehicle production environment. For example, electrification of electrical equipment onboard the vehicle being produced in the vehicle production environment is blocked until the tool is retrieved.

The RFID-enabled smartphone, tablet or wristwatch will host a software application that will list any RFID-enabled tool or part, allowing the user to scan and select the tool or part. When the user is done with the tools and returns them, the software application will list all the tools that were in the user's possession and removes the corresponding entries from the list as the tools are returned to their proper location. If there is a remaining RFID-enabled tool or part that the user forgot, the software application will inform the user the last time and where the tool was detected (in case the user ignored the alert).

As previously described, the proximity tracking computer system 70 is also configured to disable the aircraft power-up function in response to receipt of positioning sensor data indicating that a tool is located within the boundaries of a safety zone without permission. In accordance with one embodiment, this is accomplished by computing the distance D separating the tool 18 from the safety zone based on sensor inputs 82 (see FIG. 6).

Figure 12:
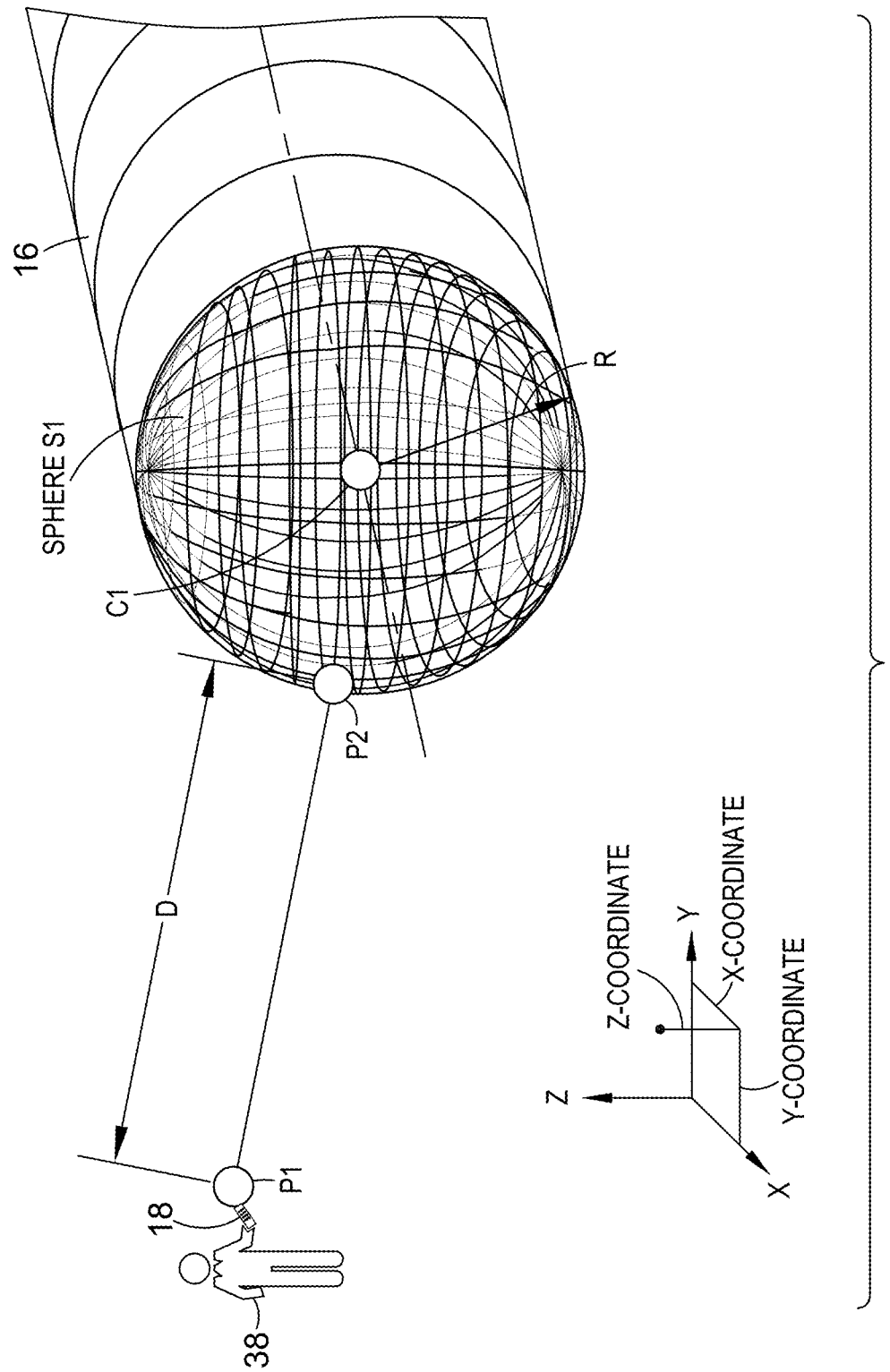
FIG. 12 is a diagram representing a tool user holding a tool at a distance from a safety zone associated with a vehicle (e.g., an aircraft) in production.

FIG. 12 is a diagram representing a tool user 38 holding a tool 18 at a distance D from a spherical safety zone S1 associated with a vehicle (e.g., an aircraft fuselage) in production. The position P1 of the tool 18, the position C1 of the center of the spherical safety zone S1 and the position P2 of a point on a surface of the spherical safety zone S1 that is collinear with points P1 and C1 in the master coordinate system of the sensor network are known to the system. The proximity tracking computer system 70 is configured to perform an algorithm which may be represented by the following pseudo-code:

If [the computed distance D to the surface of the sphere S1 is >0] then {the user is determined to be safe and will not be harmed by a powering up the aircraft.}
Set Warning=OFF
Else
Set Warning=ON The distance D separating points P1 and P2 shown in FIG. 12 may be determined as follows: Given a spherical safety zone S1 having a center C1 located at a coordinate position $(x_1, y_1, z_1)$, having a radius R and having a point P2 on the surface (at distance R from center C1), and further given a point P1 located at a coordinate position $(x_2, y_2, z_2)$ such that points P1, P2 and C1 are collinear, then the distance D separating points P1 and P2 (e.g., the distance separating a tool 18 at point P1 from the spherical safety zone S1) is:

$$D=((x_2-x_1)^2+(y_2-y_1)^2+(z_2-z_1)^2)^{-1/2}-R$$

On the one hand, if D is a positive value, then point P1 is outside of the sphere S1 and the separation distance is D. No alarm will be activated. On the other hand, if D is a negative value, then point P1 is inside of the sphere s1 and the separation distance D is effectively 0 (zero). In this situation, the alarm will be activated.

In accordance with some embodiments, the safety zones correspond to nested volumes of space, in which case the respective distances separating the tool 18 from each safety zone may be calculated to more accurately determine if the tool 18 is in the red zone, yellow zone or green zone.

Thus, the sensor outputs (locations) associated with personnel, tools, small vehicles, carts, and other items are monitored by the system. If a tool or other equipment goes missing, the controller monitors the current location and location history of the missing equipment so it can be found and removed from the aircraft.

Each person, tool or device has an identification tag attached thereto. In an exemplary embodiment, the identification tags are passive RFID tags. Passive RFID tags do not include a power source and transmit a signal only upon receiving radio frequency signals and energy emitted from an RFID reader in proximity to the RFID tag. In alternative embodiments, the identification tags may be active RFID tags. Active RFID tags include their own power source, such as a battery, and actively broadcast their information. In other embodiments, the identification tags may be any other active or passive tag suitable for providing an identification of an asset to a device spaced apart from the asset. Identification tags store identification data concerning the particular asset to which they are attached, such as an asset type and a serial number. The RFID reader includes a transmission antenna and a receiving antenna. Each RFID tag is an electronic device that includes a microprocessor combined with an antenna housed in a compact package. The packaging is structured to allow each RFID tag to be attached to the asset to be tracked/monitored. Each microprocessor of each RFID tag is encoded with a unique identifier. In order to locate a particular asset, the RFID tag attached to the specific asset will be activated. Once the RFID tag is activated, the RFID tag will transmit a location signal encoded with the unique identifier.

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for tracking personnel and tools in a vehicle production environment have been described with reference to various embodiments, it will be understood by those skilled in the art that various changes may be made and equivalents may be substituted for elements thereof without departing from the scope of the claims set forth hereinafter. In addition, many modifications may be made to adapt the teachings herein to a particular situation without departing from the scope of the claims.

The methods described herein may be encoded as executable instructions embodied in a non-transitory tangible computer-readable storage medium, including, without limitation, a storage device and/or a memory device. Such instructions, when executed by a processor or computer, cause the processor or computer to perform at least a portion of the methods described herein.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. A method for tracking objects in a vehicle production environment, the method comprising:
   (a) constructing a digital map including virtual boundaries of a vehicle and a first virtual safety zone positioned in accordance with a coordinate system of a sensor network using vehicle model data and safety specifications;
   (b) receiving sensor inputs from the sensor network; and
   (c) determining a virtual location of the object on the digital map based on sensor inputs which locate the object in the coordinate system of the sensor network.

2. The method as recited in claim 1, wherein step (c) further comprises estimating an actual distance separating the object from a hypothetical geometric boundary in physical space corresponding to the first virtual safety zone by calculating a virtual distance separating the virtual location of the object from the first virtual safety zone in the digital map.

3. The method as recited in claim 1, further comprising issuing a first alert in response to a determination in step (c) that the virtual location of the object is within the first virtual safety zone.

4. The method as recited in claim 3, wherein the vehicle includes electrical equipment in a zone corresponding to the first virtual safety zone, the method further comprising blocking electrification of the electrical equipment in response to issuing the first alert.

5. The method as recited in claim 3, wherein the digital map constructed in step (a) further comprises a second virtual safety zone that is contiguous with and outwardly offset from the first virtual safety zone, further comprising issuing a second alert in response to a determination in step (c) that the virtual location of the object is within the second virtual safety zone.

6. The method as recited in claim 5, wherein the first and second virtual safety zones are governed by programmable rules that act in safety response modes of increasing priority.

7. The method as recited in claim 6, further comprising customizing and changing the programmable rules to meet one or more of changing needs, changes to safety procedures and vehicle engineering changes.

8. The method as recited in claim 1, wherein the digital map constructed in step (a) further comprises a second virtual safety zone that is not contiguous with the first virtual safety zone, further comprising issuing a first alert in response to a determination in step (c) that the virtual location of the object is within either one of the first and second virtual safety zones.

9. The method as recited in claim 8, wherein the vehicle is an aircraft and step (a) further comprises creating the first and second virtual safety zones using data sorted using an Aircraft System/Component Code Table and then extracted from a three-dimensional model of the aircraft.

10. The method as recited in claim 1, wherein the vehicle is an aircraft and step (a) further comprises creating the first virtual safety zone using data sorted using an Aircraft System/Component Code Table and then extracted from a three-dimensional model of the aircraft.

11. The method as recited in claim 8, wherein the vehicle includes electrical equipment in respective zones corresponding to the first and second virtual safety zones, the method further comprising blocking electrification of the electrical equipment in the one of the first and second virtual safety zones where the object is virtually located.

12. A system for tracking objects in a vehicle production environment, the system comprising a vehicle model database, a sensor network having a coordinate system, an alarm system and a proximity tracking computer system communicatively coupled to receive sensor inputs from the sensor network and send alert signals to the alarm system, wherein the proximity tracking computer system is configured to perform operations comprising:
(a) constructing a digital map including virtual boundaries of a vehicle and a first virtual safety zone positioned in accordance with the coordinate system of the sensor network using vehicle model data and safety specifications;
(b) receiving sensor inputs from the sensor network; and
(c) determining a virtual location of an object on the digital map based on sensor inputs which locate the object in the coordinate system of the sensor network.

13. The system as recited in claim 12 wherein the proximity tracking computer system is further configured to estimate an actual distance separating the object from a hypothetical geometric boundary in physical space corresponding to the first virtual safety zone by calculating a virtual distance separating the virtual location of the object from the virtual safety zone in the digital map.

14. The system as recited in claim 12, wherein the proximity tracking computer system is further configured to activate the alarm system to issue a first alert in response to a determination in operation (c) that the virtual location of the object is within the first virtual safety zone.

15. The system as recited in claim 14, wherein the digital map constructed in step (a) further comprises a second virtual safety zone that is contiguous with and outwardly offset from the first virtual safety zone, and the proximity tracking computer system is further configured to issue a second alert in response to a determination in step (c) that the virtual location of the object is within the second virtual safety zone.

16. The system as recited in claim 15, wherein the first and second virtual safety zones are governed by programmable rules that act in safety response modes of increasing priority.

17. The system as recited in claim 16, wherein the programmable rules are customized to meet one or more of changing needs, changes to safety procedures and vehicle engineering changes.

18. The system as recited in claim 12, wherein the digital map constructed in operation (a) further comprises a second virtual safety zone that is not contiguous with the first virtual safety zone, and the proximity tracking computer system is further configured to issue a first alert in response to a determination in operation (c) that the virtual location of the object is within either one of the first and second virtual safety zones.

19. The system as recited in claim 18, wherein the vehicle is an aircraft and operation (a) further comprises creating the first and second virtual safety zones using data sorted using an Aircraft System/Component Code Table and then extracted from a three-dimensional model of the aircraft.

20. The system as recited in claim 12, wherein the proximity tracking computer system comprises a proximity calculations module which is configured to calculate the virtual location of the object in the coordinate system of the sensor network based on sensor inputs received from the sensor network and then calculate a proximity value equal to a distance separating the object from the first virtual safety zone.

* * * * *